2,993,824
PROCESS FOR THE PREPARATION OF FILMS WITH A VIEW TO THEIR REPRODUCTION BY PRINTING

Francois Marcel Marie Richaudeau, 49 Rue du Docteur Calmette, Loos, France
Filed Apr. 15, 1958, Ser. No. 728,612
Claims priority, application France May 31, 1957
1 Claim. (Cl. 154—118)

The present invention relates to a process and a device to assemble and to fix upon a transparent support films reproducing texts or pictures with a view to reproduce, by any printing process, heliogravure, offset, typography etc. . . . , the compositions and illustrations thus obtained. It is known that the films, obtained either by photography or by direct printing on transparent sheets such as "cellophane" and forming the constituent elements of a page to be reproduced by printing, are generally very carefully arranged on a transparent support which is constituted by a sheet of a suitable material and upon which they are first maintained, for instance by means of weights, and after are fixed by transparent adhesive strips to obtain a mounting thereof on transparent paper allowing the producing of an image on the gelatine. This mode of assembling and fixing is somewhat long and delicate, particularly because of the required accuracy, specially for color printing: great care is to be taken to prevent the various films disposed on the support from shifting, either before or during their gluing.

The object of the present invention is a process which greatly facilitates these operations. This process is essentially characterized in that it consists in fixing in position the films in their selected places on the transparent support (or the transparent supports) by creating a vacuum underneath said support (or said supports) which are therefor provided with suitable bores.

According to a further feature of the invention, the films held in position on the transparent support by a suction produced under said support are fixed thereto by welding: to this effect, the films or the transparent support utilized according to the invention, or both, are previously coated with an adhesive material allowing, after drying, the films and the support to be welded by applying heat along continuous lines or on series of points. According to an alternative, the films and the transparent support are made of a thermoplastic material capable of being welded by a suitable heating tool. According to a further alternative, the films are held in position by applying a suction under a provisional porous support, which may be opaque, for instance a sheet of porous paper, the transparent support being then arranged upon the films and welded thereto as stated above.

By way of example, a form of embodiment of a device for the application of the process according to the invention is described hereafter and schematically illustrated in the annexed drawings.

Figure 1A:
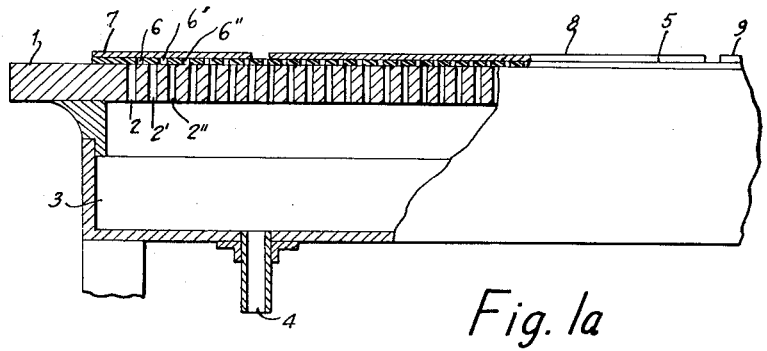
FIG. 1a is a fragmentary view of the apparatus shown in FIG. 1 on an enlarged scale.
Figure 1:
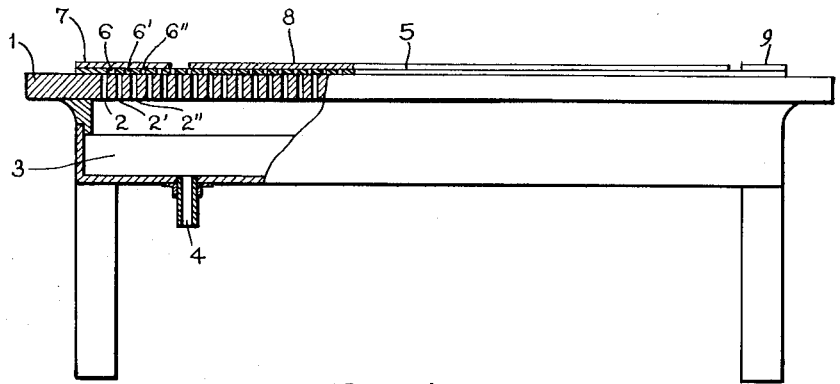
FIG. 1 is a diagrammatic elevation view, partly in section of apparatus for carrying out the method according to the invention.

As shown in the drawings in which like reference numerals refer to like parts, and more particularly to FIGS. 1 and 1a the equipment for carrying out the process according to the invention includes a preferably luminous working-table 1, bored with a very large number of holes 2. The holes are spaced at a distance from each other of about 1 cm. and have a diameter of several tenths of a millimeter. The perforated table 1 is fixed in an air-tight way on a stand 3, the upper part of which, at least, is hollow to form a vacuum chamber connected by the piping 4 with a suction pump (not shown).

Upon the table 1 is placed a transparent support 5, constituted according to the invention by a sheet of a suitable material provided with holes 6 similar to the holes in the table 1. The films to be assembled 7, 8, 9, are disposed on the support in their selected locations. The suction created under these films by the pump holds them firmly against the transparent support 5 so that the films can be fixed upon the support, for instance, in the known way, with the transparent sticking strips, without incurring the risk of displacing these films.

It is better nevertheless, to use, according to the invention, a simpler process which consists in previously coating either the upper face of the transparent support, either the lower face of the film, or both at same time, with a thermo-weldable glue which after drying and in the cold state forms a film perfectly dry but able to become adhesive when heated. When the films are placed upon the support thus prepared and fixed in position by the suction, the points or lines of welding are obtained by means of a small heating pin. This pin can be made like a small electrical soldering bit and designed so that it can be heated up to the suitable temperature to cause the glue to be adhesive without damaging the films and their support.

It must be noted that it is not necessary to bring the holes 6 in the transparent support 5 to register with the holes 2 in the table 1 as the normally used transparent supports are sufficiently rigid and do not close tightly the holes 2 of the table when they are pressed against this table by the suction so that the vacuum can be transmitted through the clearance subsisting between the support 5 and the table 1 and by the holes 6 up to the lower face of the films 7, 8, 9, and press these films firmly against the support.

In some cases, it is possible to use, instead of a transparent support placed between the table and the films two or several transparent supports, all being perforated so that the suction may be transmitted to the film.

In some cases also, one of the supports can be opaque and made, for instance, with a perforated sheet of cardboard.

Figure 1B:
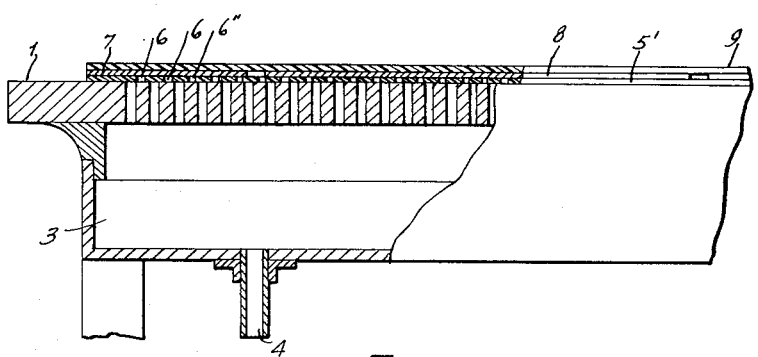
FIG. 1b is a fragmentary view of another mode of carrying out the method according to the invention.

According to another mode of performance of the process according to the invention, as shown in FIG. 1b, the films 7, 8, 9 are disposed on a perforated or porous support 5', for instance a sheet of paper, under which is created a vacuum and are covered with the transparent support 10 with which they are tightly joined either by gluing or welding.

As the first support placed upon the perforated plate through which is created the vacuum is only used to correctly place the films in position, it is not necessary for this support to be transparent and the only condition required is the permeability under suction. It is possible to use as support an opaque or translucent sheet, perforated or simply porous, for instance a sheet of paper which offers the additional advantage of allowing to initially trace the location for the films, allowing thereby an easy and fast positioning. The transparent support is then placed over the films. In addition, as the transparent support need not be perforated, it is possible to make use of the transparent supports used in the customary assembling process and also, by selecting among the transparent supports existing in the trade, the supports made of a suitable material, the welding of this support upon the films can be carried out directly without a previous coating with a thermo-weldable glue, simply by softening this plastic material with the heating pin.

What I claim is:

A method of assembling and fixing films of printed matter or pictures on a transparent support for reproduction by a printing process comprising, providing the films, the transparent support and an air-pervious support, positioning the films on a side surface of the air-pervious support at selected positions within the periphery of said air-pervious support, applying a vacuum suction to said air-pervious support on a side surface thereof opposite to said side surface on which said films are disposed and at areas thereof spaced from one another in a random manner and effective to create a corresponding suction on corresponding areas on the side surface on which the films are disposed thereby to create a pressure differential between opposite side surfaces of the films so that the films are held in fixed position on said air-pervious support during the application of said vacuum suction, positioning said transparent support overlying said films while they are held in fixed position on said air-pervious support while the vacuum suction is applied thereto, and at least semipermanently fixing said films to said transparent support during application of said vacuum suction.

References Cited in the file of this patent

UNITED STATES PATENTS

| | | |
|---|---|---|
| 1,242,523 | Cornwall | Oct. 9, 1917 |
| 1,813,690 | Weisker | July 7, 1931 |
| 1,851,028 | Worrall | Mar. 29, 1932 |
| 2,122,474 | Karl | July 5, 1938 |
| 2,620,289 | Douglas | Dec. 2, 1952 |